United States Patent
Noguchi et al.

(10) Patent No.: US 9,880,589 B2
(45) Date of Patent: Jan. 30, 2018

(54) INSTRUMENT EJECT SYSTEM

(71) Applicant: LENOVO (SINGAPORE) PTE. LTD., Singapore (SG)

(72) Inventors: Hiroyuki Noguchi, Tokyo-to (JP); Takahiro Onodera, Sagamihara (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 13 days.

(21) Appl. No.: 15/179,369

(22) Filed: Jun. 10, 2016

(65) Prior Publication Data

US 2017/0357290 A1  Dec. 14, 2017

(51) Int. Cl.
*G06F 1/16* (2006.01)
*G06F 3/0354* (2013.01)

(52) U.S. Cl.
CPC .......... *G06F 1/1656* (2013.01); *G06F 1/1616* (2013.01); *G06F 1/1637* (2013.01); *G06F 3/03545* (2013.01); *G06F 2200/1632* (2013.01)

(58) Field of Classification Search
CPC .......... G06F 2200/1632; G06F 1/1616; G06F 1/1637; G06F 1/1656; G06F 3/03545
See application file for complete search history.

(56) References Cited

U.S. PATENT DOCUMENTS

| | | | |
|---|---|---|---|
| 5,756,941 A * | 5/1998 | Snell ................... | G06F 1/1626 178/19.01 |
| 6,161,882 A * | 12/2000 | Murphy ................ | G06F 1/1616 292/300 |
| 2002/0003532 A1* | 1/2002 | Huat .................... | G06F 1/1616 345/179 |

* cited by examiner

Primary Examiner — James Wu
(74) Attorney, Agent, or Firm — Shimokaji IP (57) ABSTRACT

An instrument eject system includes a device configured to store an instrument at a storage location within the device. A cover is rotationally coupled to a base via hinge. An ejection element is configured to impose an ejecting force on the instrument when the instrument is stored within the device. A retaining element is configured to retain the instrument within the device in a lock position of the retaining element and to release the instrument in a release position of the retaining element.

15 Claims, 11 Drawing Sheets

INSTRUMENT EJECT SYSTEM

BACKGROUND OF THE INVENTION

The present invention relates to electronic device accessories and, more particularly, to a storage and removal system for a stylus stored in an electronic device incorporating a touchscreen.

Electronic devices incorporating touchscreens may include a stylus as a preferred method for a user to provide input or interface with the touchscreen. A stylus may be held separately from the electronic device. For example, it may be stored in a bag, in clothing, or some other storage that may be detached from the device. This may make it inconvenient for a user to access the stylus when needed and may result in the stylus getting lost. Some electronic devices may include a storage compartment for storing the stylus. However, manual removal of the stylus from the compartment may be inconvenient and may lead a user to employ his fingers in interacting with the touchscreen, which may transfer dirt to the touchscreen.

Additionally, certain devices may be configured to allow a user to use the device either as a laptop computer or a tablet computer. An example of such dual function device may be found in U.S. Pat. No. 8,687,354. For these devices, it may be beneficial to have a stylus handily available when using the device as a tablet, but have the stylus out of sight when using the device as a laptop.

As can be seen, there is a need for an improved system which provides convenient access to the stylus and encourages use of the stylus for touchscreen applications.

SUMMARY OF THE INVENTION

In one aspect of the present invention, an instrument eject system comprises a device configured to store an instrument at a storage location within the device, the device including a cover rotationally coupled to a base via a hinge; an ejection element configured to impose an ejecting force on the instrument when the instrument is stored within the device; and a retaining element configured to retain the instrument within the device in a lock position of the retaining element and to release the instrument in a release position of the retaining element, wherein in the lock position, the retaining element is configured to impose a retaining force on the instrument when the instrument is stored within the device, the retaining force being sufficient to overcome the ejecting force of the ejection element and to retain the instrument within the device, and in the release position, the retaining element is configured to release the instrument and allow the instrument to be ejected from an opening in the device by the ejecting force of the ejection element.

In another aspect of the present invention, a device configured for touch screen use comprises: a storage location for a stylus within the device; a cover housing a touch screen; a base rotationally coupled to the cover via a hinge; an ejection element configured to eject the stylus from the storage location; and a retaining element configured to retain the stylus within the device by preventing its ejection by the ejection element, wherein the retaining element is further configured to release the stylus upon a rotation of the cover with respect to the base to allow the stylus to be ejected.

In yet another aspect of the present invention, an instrument eject system comprises a storage location for the instrument; an ejection element configured to impose an ejecting force to eject the instrument from the storage location; and a retaining element translatable between a lock position and a release position, the retaining element configured to retain the instrument in the lock position by opposing the ejecting force, and further configured to release the instrument to be ejected in the release position.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims. However, any single inventive feature may not address any of the problems discussed above or may only address one of the problems discussed above. Further, one or more of the problems discussed above may not be fully addressed by any of the features described below.

Various inventive features are described below that can each be used independently of one another or in combination with other features.

Broadly, the present invention provides a pop-out or eject system for an instrument configured for touchscreen interaction, such as a stylus. The eject system may be configured to store the instrument in a storage location of a clamshell device and may comprise an ejection element configured to eject the instrument from the storage location, upon rotation of a cover of the device. In an embodiment, the instrument may be ejected upon a rotation of the cover to or beyond a specific rotation point.

With reference to FIGS. 1A-6G, an eject system 100 for an instrument 106 can comprise a device 102 (having a cover 108 and a base 110) and an ejection element 107 configured to eject the instrument 106 from an opening 138 of the device 102. The ejection element 107 may be configured to eject the instrument 106 upon a rotation of the cover 108 of the device 102 with respect to the base 110 of the device 102. The eject system 100 may include a storage guide 104 within the device 102 and configured to guide the instrument into a storage position wherein it may engage with the ejection element 107, and to eject the instrument 106 from the device 102 through the opening 138.

The system 100 may further include a retaining element 105 configured to retain the instrument 106 within the device 102. The retaining element 105 may be configured to retain the instrument 106 by preventing its ejection by the ejection element 107. The retaining element 105 may further be configured to release the instrument 106 upon a rotation of the cover 108 with respect to the base 110, whereby the instrument 106 may be ejected by the ejection element 107. The retaining element 105 may be linked to a hinge 111 of the device 102, whereby rotation of the hinge 111 may cause the retaining element 105 to translate and release the instrument 106 allowing the instrument 106 to be ejected. In embodiments, the retaining element 105 may be configured to release the instrument 106 upon a rotation of the cover 108 to or beyond a specific angle with resect to the base 110.

With reference to FIGS. 1A-1E, the device 102 can be an electronic device having a clamshell configuration, wherein the cover 108 is rotationally coupled to the base 110 via at least one hinge 111, and in embodiments via a plurality of hinges 111, such as two hinges as shown in the Figures. The hinge 111 may be connected to a back edge portion 122 of the cover 108 and a back edge portion 124 of the base 110. The cover 108 may pivot around the hinge 111 relative to the base 110. The device 102 may further include a display unit or a screen 112 housed within the cover 108. The screen 112 may be capable of functioning as a touchscreen and receiving user input via the instrument 106, which may be a stylus.

In embodiments, the device 102 may further include a keyboard 113 which may be housed within the base 110 and may allow user input via the keyboard 113 or through touch of the screen 112. In embodiments, the device 102 may be a dual function device capable of functioning in a first mode which may be a touchscreen mode 114 (e.g., as a tablet), and in a second mode which may be a keyboard mode 116 (e.g., as a laptop computer). Such dual function device may be referred to as a touchscreen laptop or a tablet PC and may include laptop computer system, such as one of the Think-Pad® and Yoga® series of personal computers sold by Lenovo (US) Inc. of Morrisville, N.C. In embodiments, such dual function device may allow the cover may rotate substantially 360°, via the hinge 111 such that an outer side 118 of the cover 108 opposite the screen 112 may abut an outer side 120 of the base 110 opposite the keyboard 113 (see FIGS. 1D and 1E).

Figure 1A:
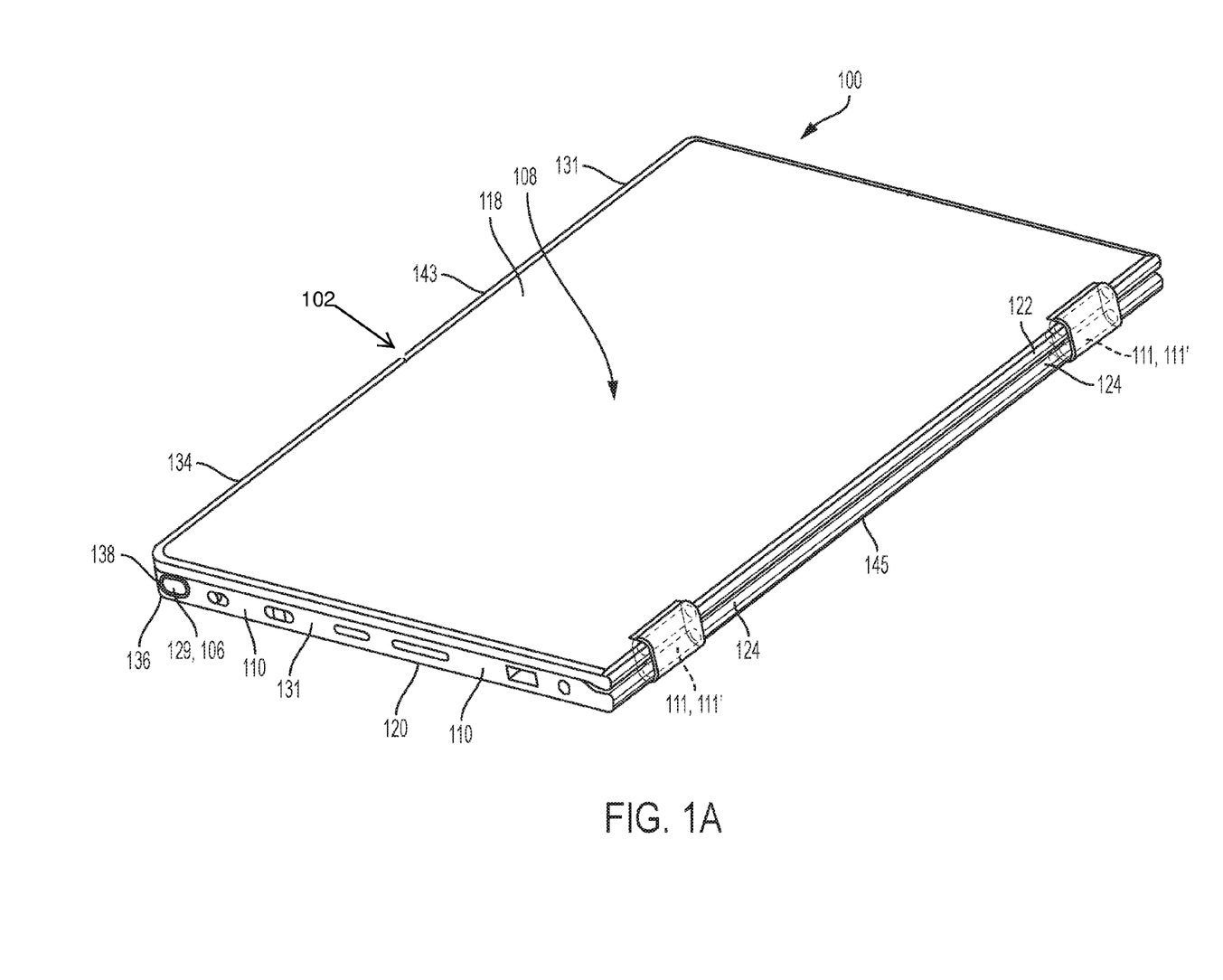
FIG. 1A is a perspective view of a device and an instrument of an instrument eject system in accordance with an embodiment of the present invention, with the device shown in a closed position and with the instrument in a stored position.
Figure 1B:
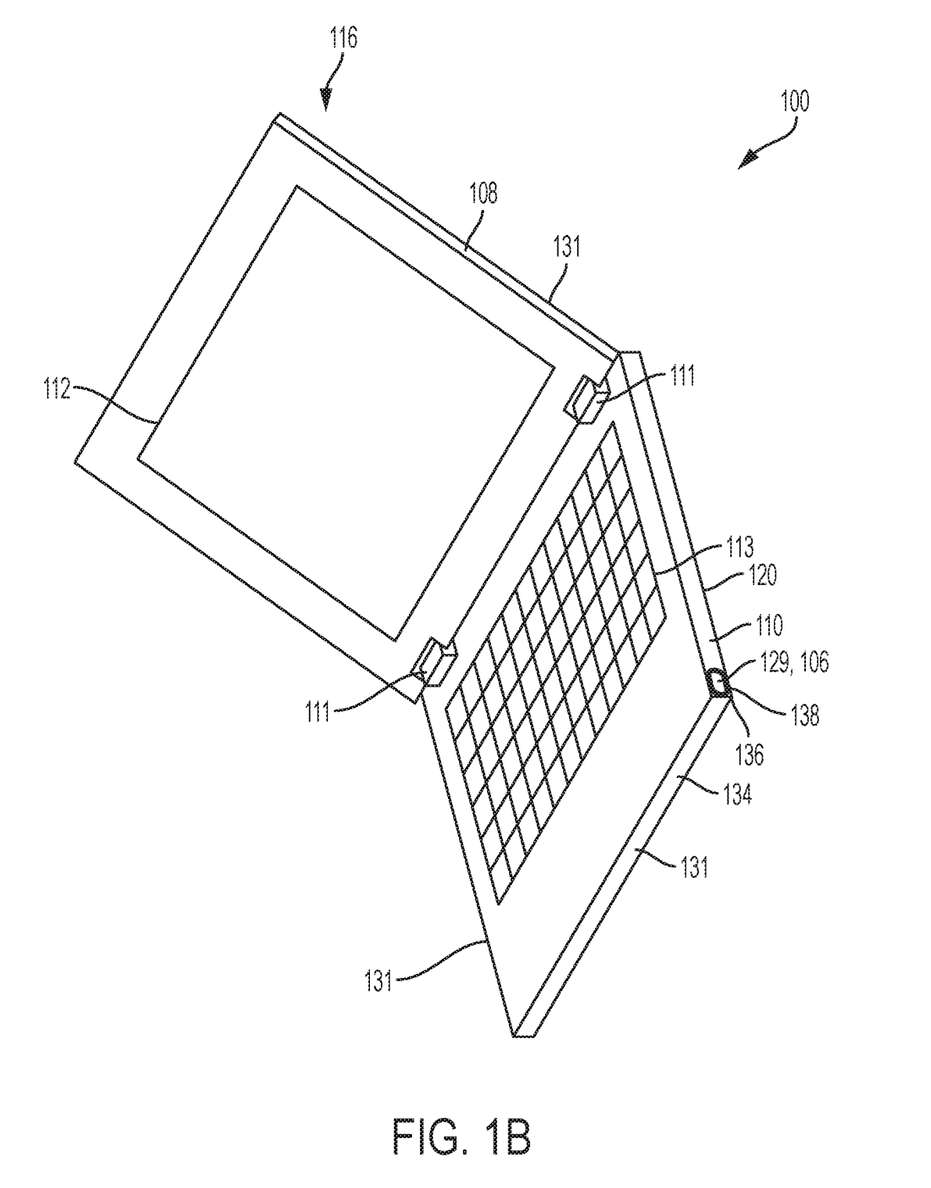
FIG. 1B is a perspective view of the device and instrument of FIG. 1A, with the device shown in an open position and with the instrument in the stored position.
Figure 1C:
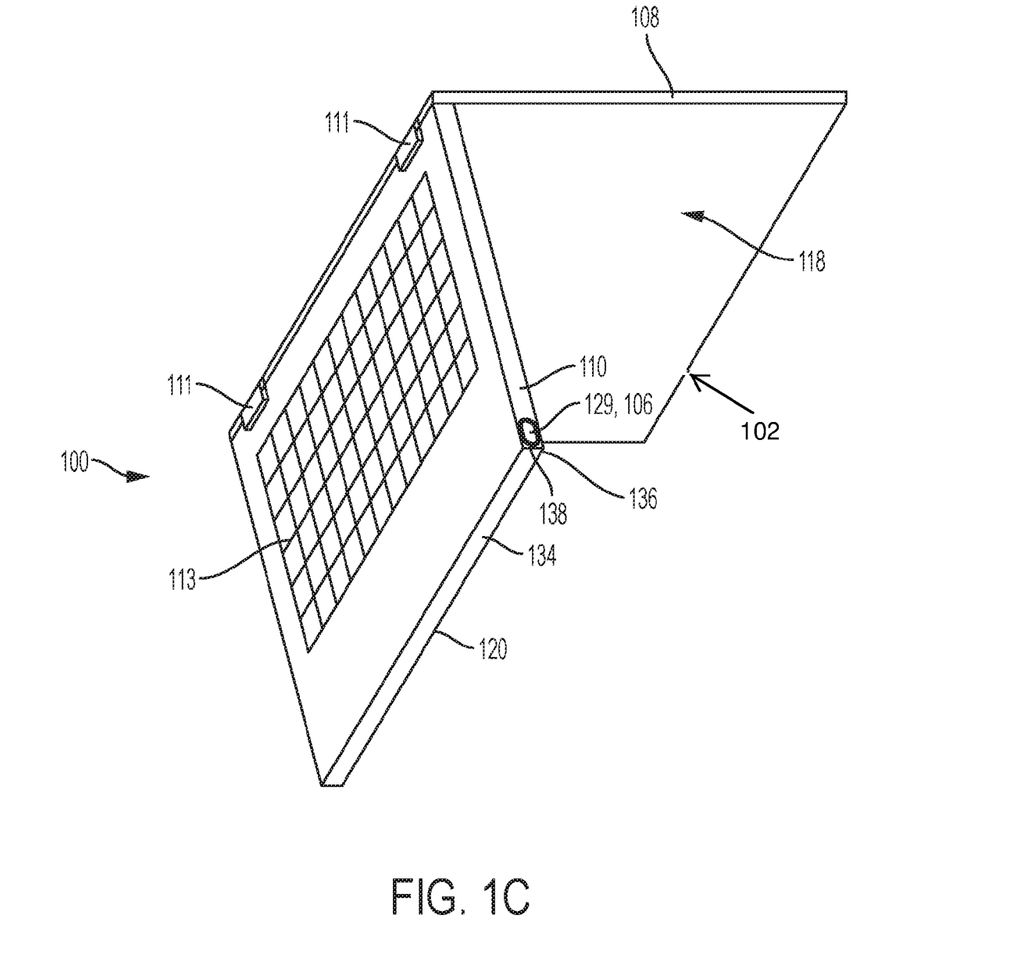
FIG. 1C is a perspective view of the device and instrument of FIG. 1A, with the device shown in an open position and with the instrument in the stored position.

The opening 138 may be formed at a segment of the device frame 131, such as at or near a front edge corner 136 of the frame 131 adjacent a storage location 121 of the instrument. A first end 129 of the instrument 106 may be structured to conform a shape of the opening 138, for example, via a tab 117, such that when stored the first end 129 may be level with the frame 131 and form a continuous segment of the frame 131, as shown in FIGS. 1A-1C.

Figure 2A:
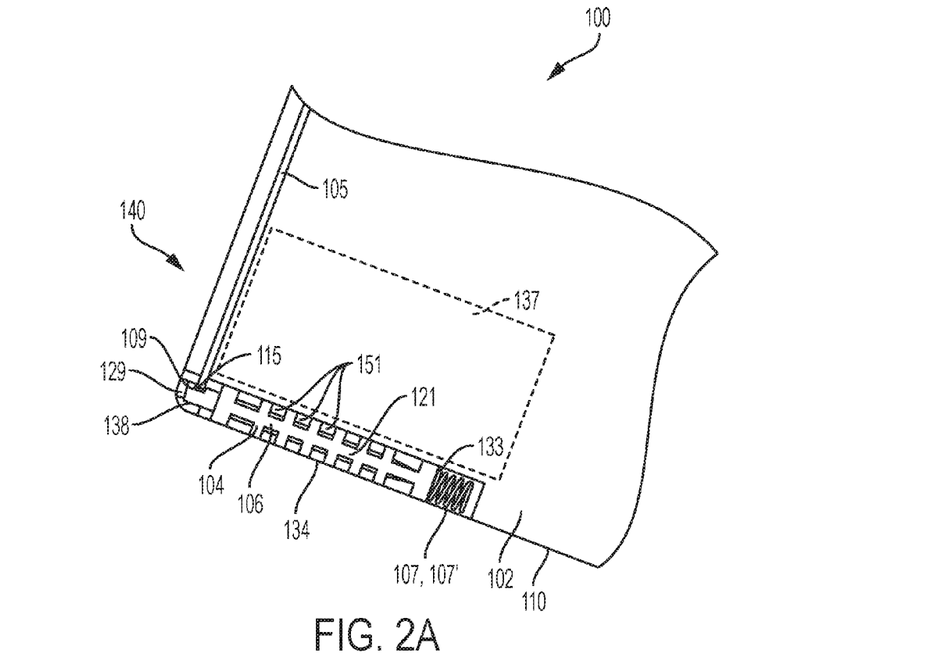
FIG. 2A is an internal view of a base of the device of FIG. 1A, with the instrument in the stored position.
Figure 2B:
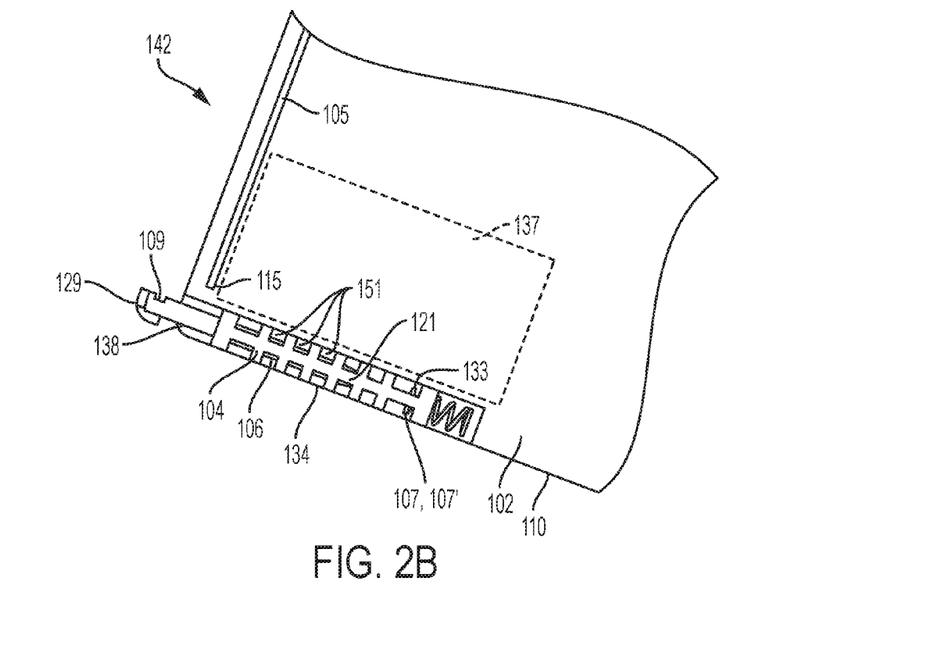
FIG. 2B is an internal view of the base of FIG. 2A, with the instrument shown ejected.

The storage location 121 for storing the instrument 106 inside the base 110 may be as shown in FIGS. 2A and 2B. Thus, the opening 138 may be in the frame of the base 110. However, the storage location 121 may also be inside the cover 108 according to contemplated embodiments.

The eject system 100 can be configured such that the storage location 121 may not interfere with the device hardware 137. To this end, the storage location 121 may be proximate and parallel to a front edge portion 134 of the frame 131, as shown in FIGS. 2A and 2B, such that it is removed from the device hardware 137. In embodiments, the storage location 121 may be inside the base 110.

In embodiments, the storage guide 104 may be configured to contain the instrument 106 at the storage location 121 within the device 102, and guide the instrument to engage with the ejection element 107 and eject from the opening 138. The storage guide 104 may generally be structured to conform to the shape of the instrument 106 and may be elongated (i.e., having a tube-like structure) to conform to the shape of a rod-shaped instrument. The storage guide 104 may be a solid tube structure or include openings 151 as shown in FIGS. 2A and B, according to various embodiments. In alternate embodiments, a portion of the device hardware 137 may also function as the storage guide 104, such that the system 100 need not include the storage guide 104 as a separate structure.

With continuing reference to FIGS. 2A and 2B, the ejection element 107 may be an elastic element configured to impose an ejecting force against the instrument 106, directing the instrument 106 out of the storage guide 104. In embodiments, the ejection element 107 may be a spring 107' configured to contact a second end 133 of the instrument 106, opposite the first end 129, when the instrument is stored in the device 102, such that storage of the instrument 106 compresses the spring 107', as shown in FIG. 2A. Other eject mechanisms, for example, an elastic band, a stretched spring, etc. configured to impose a stored ejecting force on the instrument when the instrument is stored in the device 102, are within the scope of contemplated embodiments.

The retaining element 105 may be configured to retain the instrument 106 in a lock position 140 of the retaining element 105 and to release the instrument in a release position 142 of the retaining element. In the lock position 140, the retaining element 105 may impose a retaining force on the stored instrument 106 sufficient to overcome the ejecting force imposed by the ejection element 107. In the release position 142, the retaining element 105 may release its retaining force to allow the force of the ejection element 107 to cause the instrument 106 to eject. In embodiments, the retaining element 105 may translate linearly in opposite directions from the lock position 140 to the release position 142 upon a rotation of the cover 108 with respect to the base 110 of the device 102. For example, the retaining element 105 may translate towards the front edge 143 of the device 102 for the lock position 140 and towards a back edge 145 of the device 102 for the release position 142 via a link with a rotational element of the hinge 111.

Figure 3A:
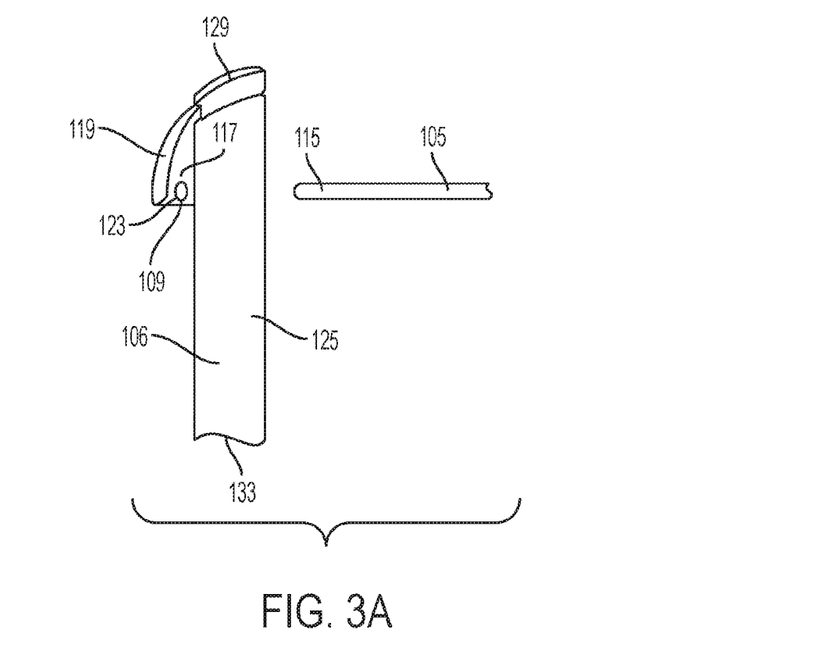
FIG. 3A is a perspective view of the instrument of FIG. 1A, and a retaining element of the eject system.
Figure 3B:
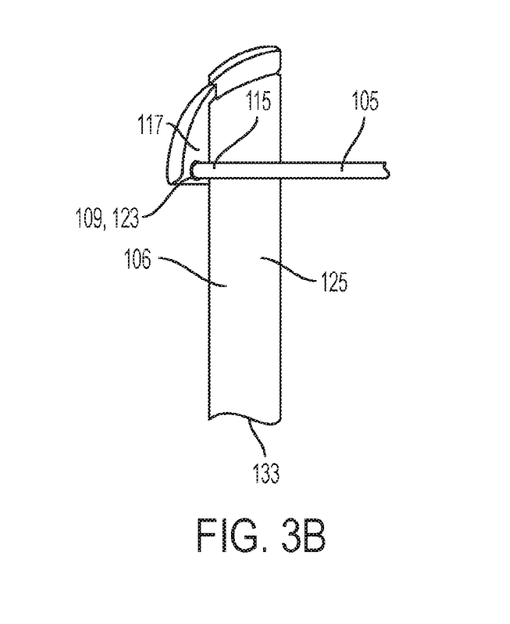
FIG. 3B is a side view of the instrument and retaining element of FIG. 3A, in a retained configuration.

With particular reference to FIGS. 3A and 3B, and continuing reference to FIGS. 2A and 2B, the instrument 106 may include an engagement element 109 configured to engage with the retaining element 105 for retaining the instrument 106. For example, the engagement element 109 may comprise a notch 123, wherein the retaining element 105 may include an insertion end 115 which may be an end of the retaining element 105 and configured to insert into the notch 123 in the lock position 140 to hold the instrument 106 in the storage location 121 (see FIG. 2A). The retaining element 105 may be perpendicularly oriented with respect to the stored instrument 106, as shown in FIGS. 2A and 2B, such that a forward translation (i.e. towards front edge 143) of the retaining element 105 causes the insertion end 115 to insert into the notch 123. In embodiments, a tab 117 may be provided on the instrument 106 to guide the instrument 106 through the opening 138 in an orientation wherein the notch 123 faces towards the insertion end 115, wherein the tab 117 has a curvature 119 which conforms to the contour of the frame 131. The notch 123 may be provided on the tab 117 (as shown in FIG. 3A), or alternatively on the main body 125 of the instrument 106. In embodiments, a user may be required to rotate the instrument 106 in order to engage it in the lock position 140.

Figure 4:
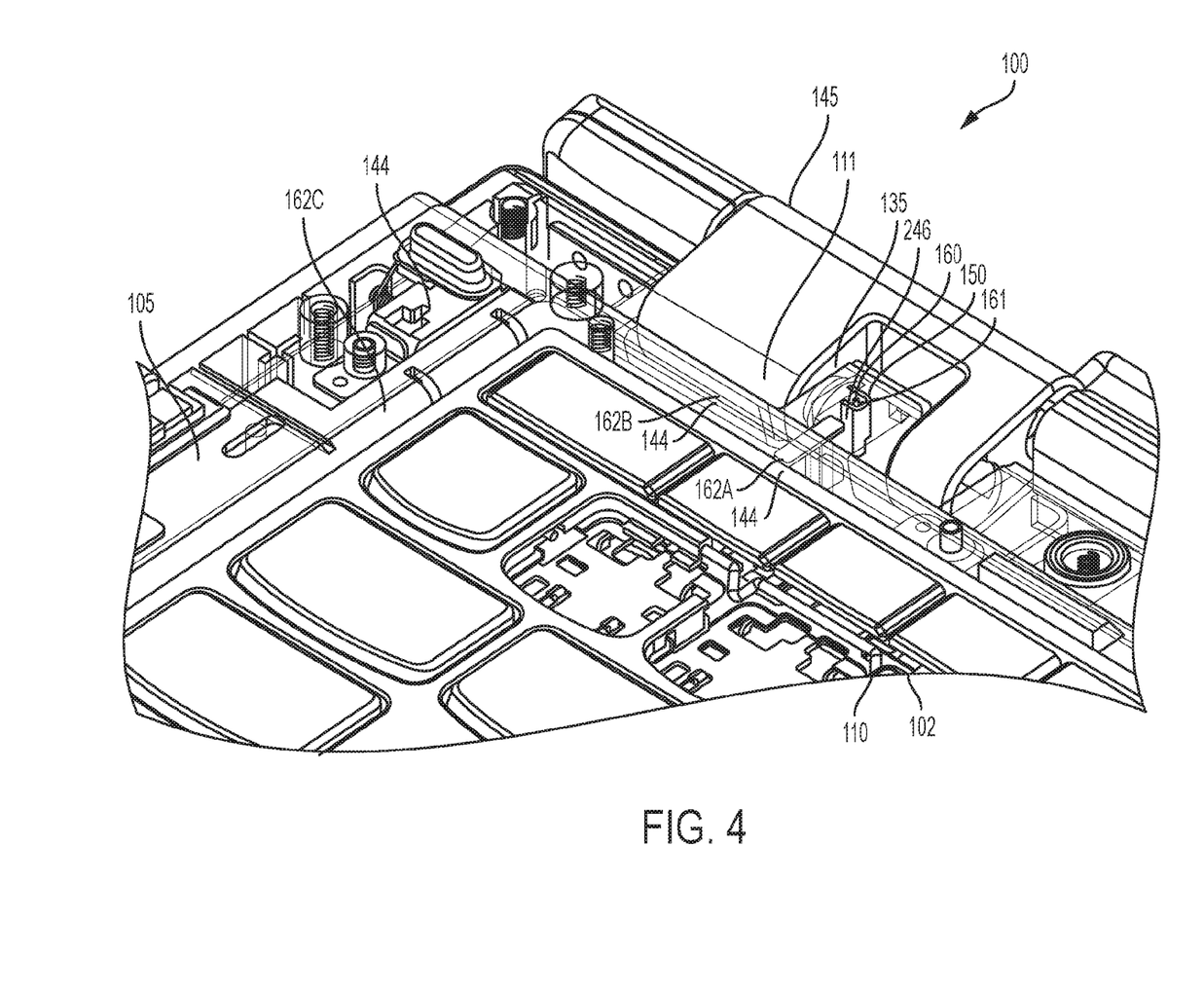
FIG. 4 is an internal view of the base of the device of FIG. 1A.

With reference to FIG. 4, the retaining element 105 may be coupled to a rotational element 135 of the hinge 111 at a coupling point 150 distal a rotational axis 246 of the rotational element 135. The retaining element 105 may be coupled via a link structure 144 to a pin 160 at coupling point 150. The link structure 144 may be configured to translate linearly according to the coupling point's rotation, wherein the circumferential distance of the coupling point's rotation is equal to the linear distance of the link structure's translation. For example, the linear distance of translation (e.g., between the lock position 140 and the release position 142) may be between about 4 mm and 5 mm, or about 4.6 mm. In embodiments, the link structure 144 may be configured to translate away from the storage location and/or instrument 106 (i.e., towards back edge 145) upon an opening rotation of the cover 108 to pull the retaining element 105 out of the lock position 140 release the instrument 106, and to translate towards the storage location 121 and/or instrument 106 upon a closing rotation of the cover 108. The link structure 144 may comprise a pin engagement bracket 161 coupled to link segments 162, for example a first link segment 162A, a second link segment 162B, and a third link segment 162C, wherein the retaining element 105 may be coupled to the third link segment 162C. The pin engagement bracket 161 may be configured to engage the pin 160 such that a rotation of the rotational element 135 may effectuate a linear translation (between the front edge 143 and back edge 145) of the first link segments 162.

In embodiments, the release position 142 may be at or beyond a specific angle (eject angle) of the cover 108 with respect to the base 110. In embodiments such as a tablet PC, the eject angle may be an angle at which it would be impractical to use the device in the keyboard mode 116. For example, in embodiments allowing for a 360° rotation, the eject angle may be an angle at or beyond about 135°, or beyond at least about 180°, as a user would not normally angle a screen much beyond 90° if desiring to use device 102 in the keyboard mode 116. However, smaller angles are also within the scope of contemplated embodiments. In embodiments, the coupling point 150 may be at a location of the rotational element 135 which is configured to rotate only after a first range of rotation of the cover 108 with respect to the base 110, which may be an angle beyond 180°, as will be explained below. The eject angle may further be determined by such factors as the distance of the coupling point 150 from the rotational axis 246, the length of the insertion end 115, the size or depth of the notch 123, the orientation of the insertion end 115 with respect to the notch 123, etc., as will be apparent to one skilled in the art.

Figure 5:
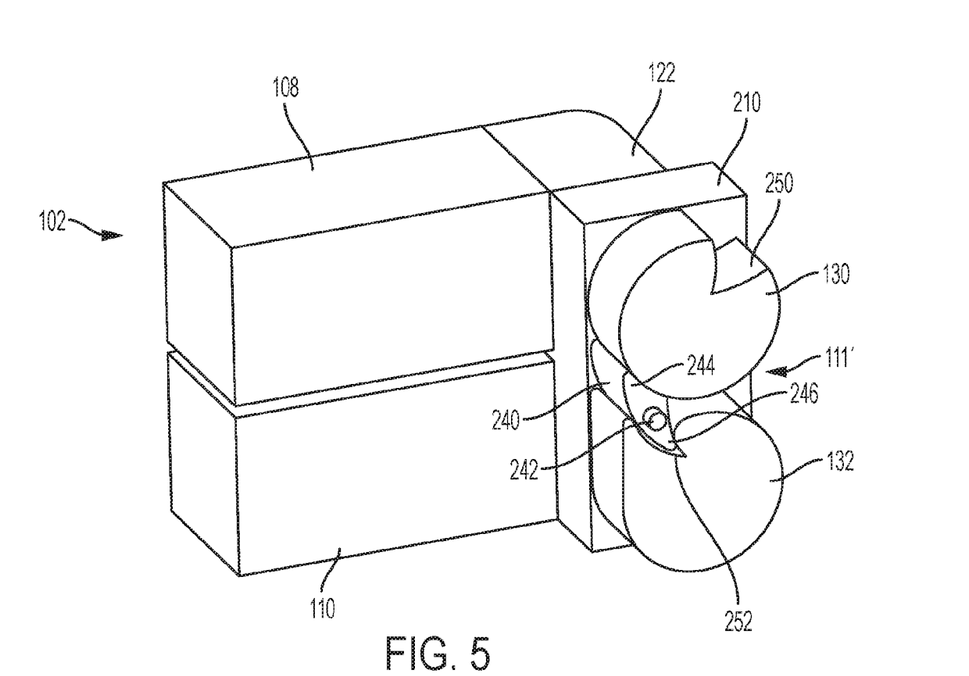
FIG. 5 is a close-up view of a hinge of the device of FIG. 1A according to an exemplary embodiment.
Figure 6A:
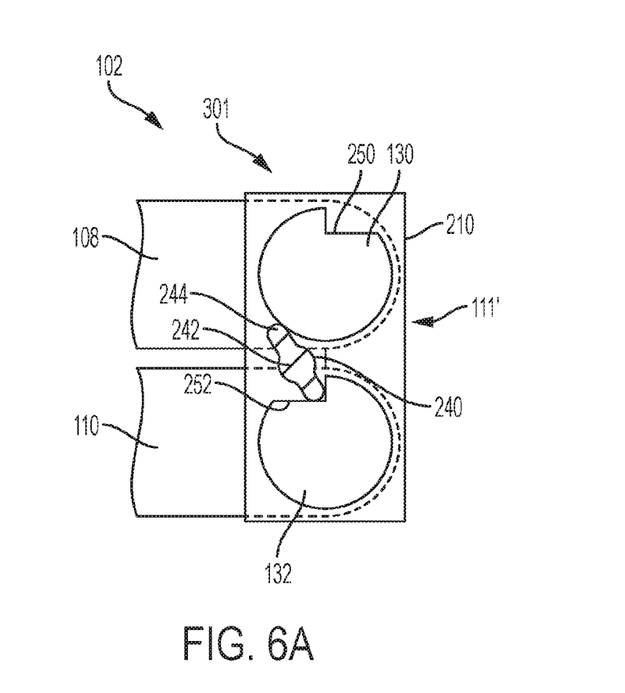
FIG. 6A is a cross-sectional view of the hinge of FIG. 5, in a first exemplary position during movement between a laptop configuration and a tablet configuration.
Figure 6B:
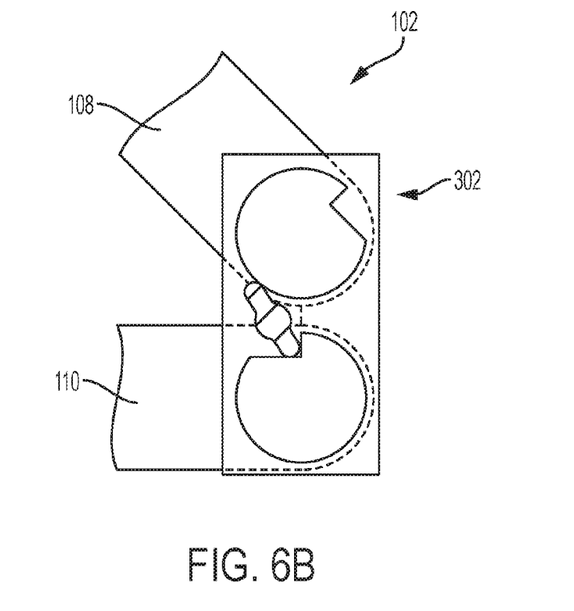
FIG. 6B is a cross-sectional view of the hinge of FIG. 5, in a second exemplary position during movement between a laptop configuration and a tablet configuration.
Figure 6C:
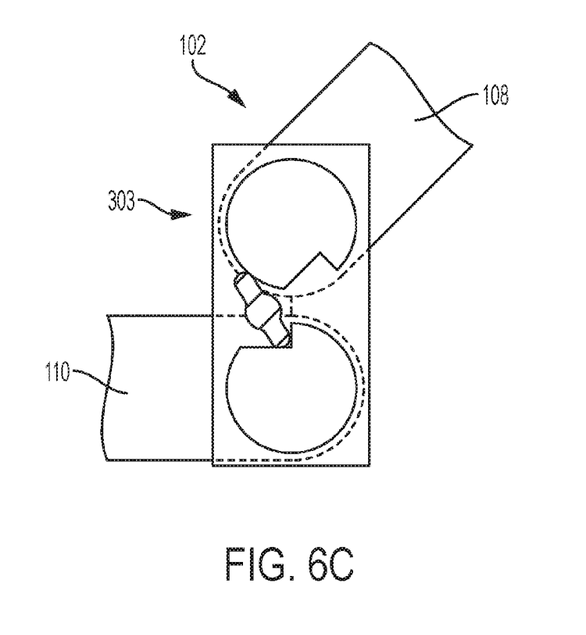
FIG. 6C is a cross-sectional view of the hinge of FIG. 5, in a third exemplary position during movement between a laptop configuration and a tablet configuration.
Figure 6D:
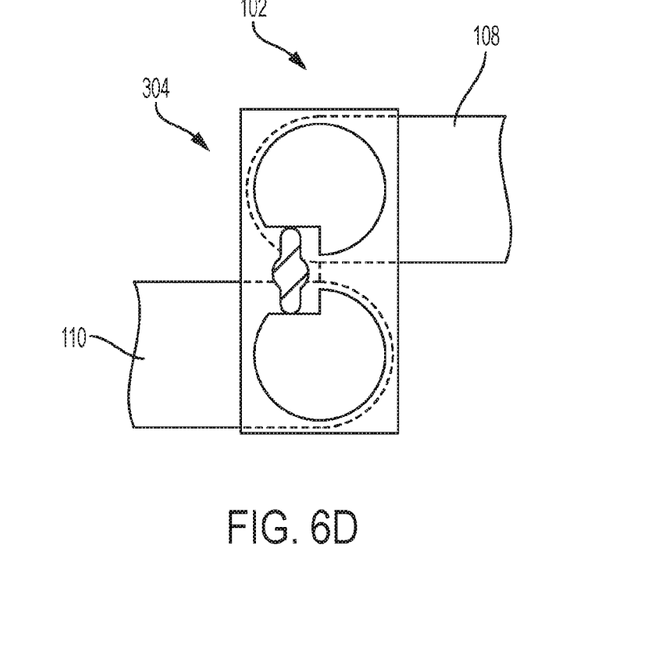
FIG. 6D is a cross-sectional view of the hinge of FIG. 5, in a fourth exemplary position during movement between a laptop configuration and a tablet configuration.

With specific reference to FIGS. 5-6D, and continuing reference to FIGS. 1A-1G, the hinge 111 may be a full rotation hinge 111' configured to enable a rotation of substantially 360° via a hinge block mechanism. The hinge 111' may comprise a hinge block 210 wherein the rotational element 135 may include a first rotational member 130 and a second rotational member 132 connected to the hinge block 210. The first rotational member 130 may be coupled to the cover 108 and the second rotational member 132 may be coupled to the base 110. The second rotational member 132 may be configured to rotate only after a first range of rotation or motion of the first rotational member 130 or cover 108, via an inhibitor stopper 240, as will be explained below. In embodiments, the first range of motion may be a 180° rotation of the cover 108 with respect to the base 110. Thus, in embodiments, the second rotational member 132 may rotate after a 180° rotation of the cover 108 with respect to the base 110. Thus, the pin 160 may be located on the second rotational member 132 forming the coupling point 150 for the link structure 144, as shown in FIG. 4, in order to effectuate a translation of the retaining element 105 after a first range of motion, which may be a rotation of a at least 180° of the cover 108, according to various embodiments.

Figure 1D:
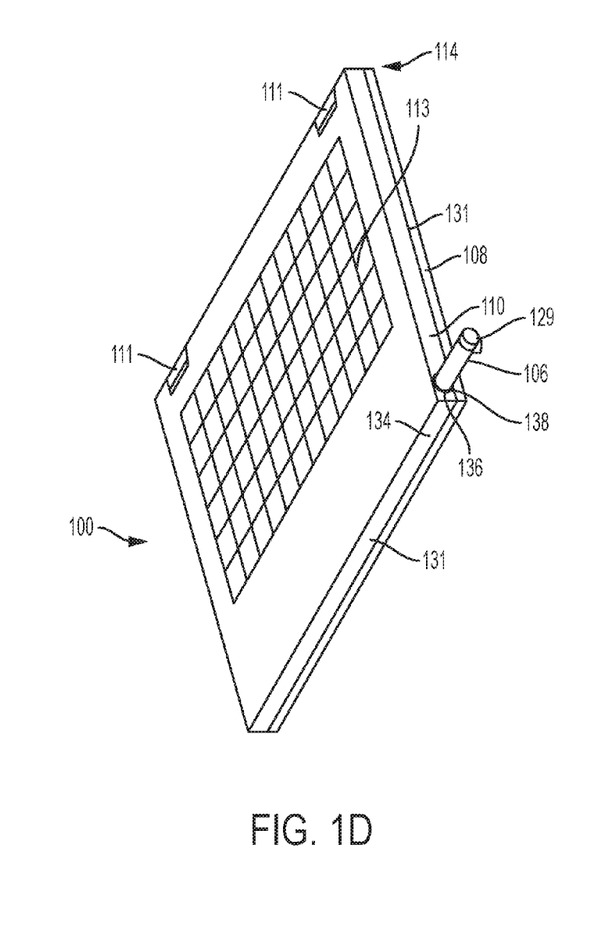
FIG. 1D is a perspective view of the device and instrument of FIG. 1A, with the device shown in a tablet configuration, with a keyboard side showing, and with the instrument ejected.
Figure 1E:
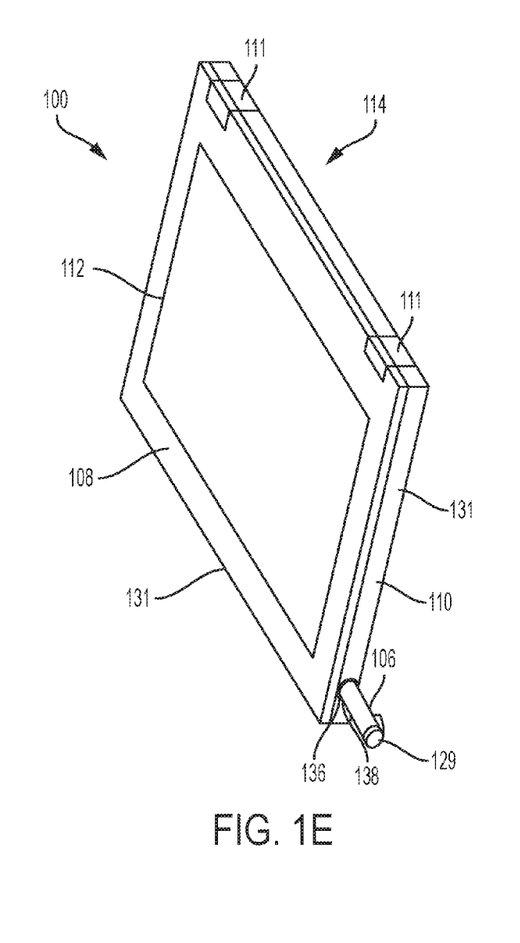
FIG. 1E is a perspective view of the device and instrument of FIG. 1A, with the device shown in a tablet configuration, with a screen side showing, and with the instrument ejected.

As shown in FIGS. 1A-E, the cover 108 may be rotatable through an angle of up to substantially 360° relative to the base 110. In operation of an exemplary embodiment, FIGS. 1B-1D show the cover 108 being opened at different angles relative to the base 110. FIG. 1E further illustrates the screen 112, which may be a touch sensitive screen, in tablet orientation.

Referring to FIG. 5, the hinge block 210 may be sandwiched between the cover 108 and the first rotational member 130; and between the base 110 and the second rotational member 132. The inhibitor stopper 240 may include a first wing 244 and a second wing 246. The inhibitor stopper 240 may be attached to the hinge block 210. The first wing 244 and the second wing 246 may be rotatable around the axis 242. Still in FIG. 5, the first rotational member 130 may include a first notch 250 at the outer perimeter of the first rotational member 130. The second rotational member 132 may include a second notch 252 at the outer perimeter of the second rotational member 132. The first notch 250 may be shaped in such a way that the first wing 244 of the inhibitor stopper 240 may fit into the first notch 250 of the first rotational member 130. Similarly, the second notch 252 may be shaped in such a way that the second wing 246 of the inhibitor stopper 240 may fit into the second notch 252 of the second rotational member 132.

Figure 6E:
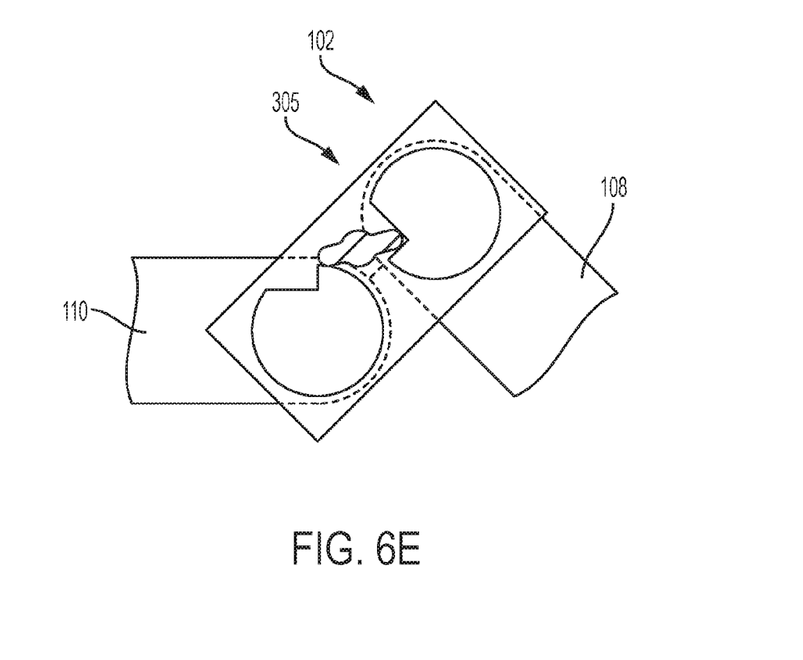
FIG. 6E is a cross-sectional view of the hinge of FIG. 5, in a fifth exemplary position during movement between a laptop configuration and a tablet configuration.
Figure 6F:
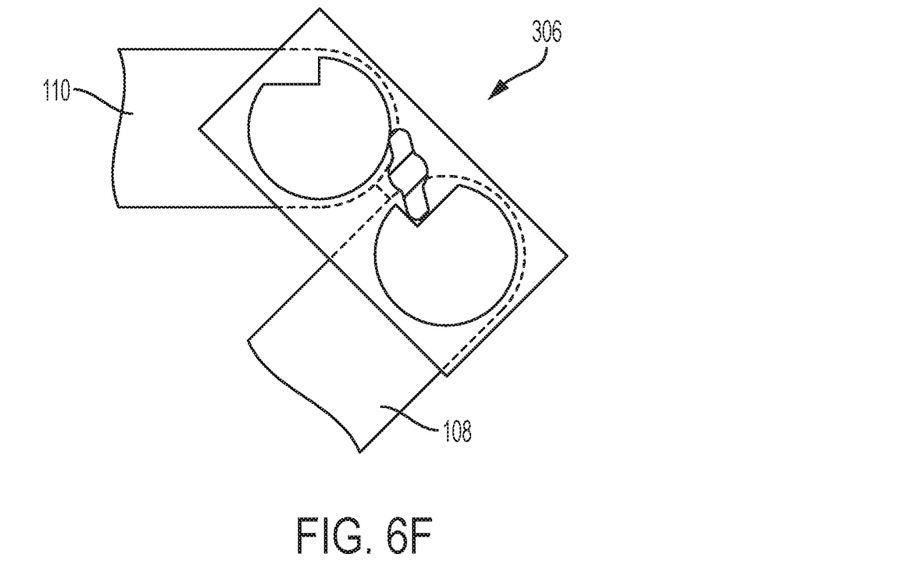
FIG. 6F is a cross-sectional view of FIG. 5, in a sixth exemplary position during movement between a laptop configuration and a tablet configuration.
Figure 6G:
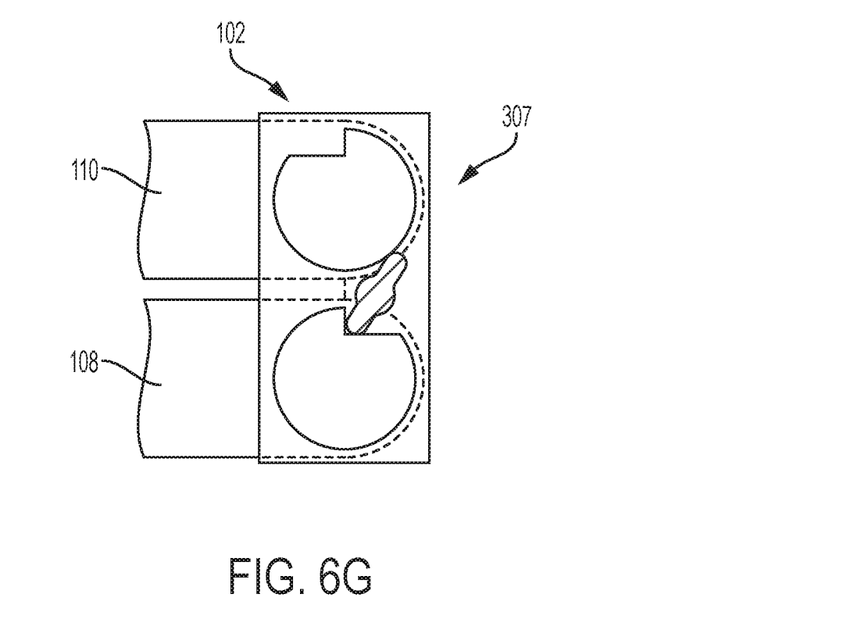
FIG. 6G is a cross-sectional view of the hinge of FIG. 5, in a seventh exemplary position during movement between a laptop configuration and a tablet configuration.

In operation of an exemplary embodiment, FIGS. 6A-6G show diagrams of modes of operation for a substantially 360° rotation, for example, in converting the device 102 from the keyboard mode 116 to the touchscreen mode 114. The device 102 is shown transitioning from the closed configuration 301 (FIG. 6A), via a laptop configuration 303 (FIG. 6C), to a tablet configuration 307 (FIG. 6G). The device 102 may change configurations in ways other than those shown in FIGS. 6A-6E, such as from a tablet configuration to a laptop configuration, for example.

Thus, the cover 108 may pivot relative to the base 110 using both the first rotational member 130 and the second rotational member 132. The first rotational member 130 may operate during a first range of motion, such as rotation of the cover 108 relative to the base 110 from 0° (FIG. 6A) to 180° (FIG. 6D). The second rotational member 132 may operate during a second range of motion, such as rotation of the cover 108 relative to the base 110 from 180° (FIG. 6D) to 360° (FIG. 6G).

When converting the device 102 from the closed configuration 301 to the tablet configuration 307, the second range of motion directly follows the first range of motion, where at least one of the first and second rotational members 130, 132 is restricted at a given time by the inhibitor stopper 240. Correspondingly, only the first rotational member 130, or the second rotational member 132, may rotate relative to the hinge block 210 at one time. Those skilled in the art may appreciate that the terms first rotational member and second rotational member may be used broadly herein to refer either to a rotational member on a single hinge or to rotational members on a series of hinges which define a single hinge axis.

As shown in mode of operation 301 of FIG. 6A, the device 102 is in a closed configuration. To convert the device 102 from a closed configuration to a tablet configuration, the user may open the cover 108 to a certain angle as shown in FIG. 6B of mode of operation 302. The cover 108 and the first rotational member 130 may pivot on the hinge block 210, with the hinge block 210 remaining fixed relative to the base 110, with the second wing 246 of the inhibitor stopper 240 preventing the second rotational member 132 from rotating. If a user wants to use the device 102 in a laptop configuration 303, and the upper housing may be further opened as shown in FIG. 6C.

The user may further rotate the cover 108 up to substantially 180° relative to the base 110 to achieve mode of operation 304 as shown in FIG. 6D, where the first wing 244 of the inhibitor stopper 240 may engage the notch 250 of the first hinge 130 and prevent the first rotational member 130 from further rotation. When the user wishes to use the device 102 as a tablet, the user may further rotate the cover 108 relative to the base 110 to achieve modes of operation 305 and 306 as shown in FIGS. 6E-6F. The cover 108, together with the hinge block 210, may rotate about the second rotational member 132 while the first wing 244 of the inhibitor 240 may prevent the first rotational member 130 from rotating.

Reversely, the base 110 may rotate about the second rotational member 132 and then the first rotational member 130 to change the notebook PC 10 from the tablet configuration 307 of FIG. 6G to the original closed position as shown in FIG. 6A.

It should be understood, of course, that the foregoing relates to exemplary embodiments of the invention and that modifications may be made without departing from the spirit and scope of the invention as set forth in the following claims.

We claim:

1. An instrument eject system comprising:
    a device configured to store an instrument at a storage location within the device, the device including a cover rotationally coupled to a base via a hinge;
    an ejection element configured to impose an ejecting force on the instrument when the instrument is stored within the device; and
    a retaining element configured to retain the instrument within the device in a lock position of the retaining element and to release the instrument in a release position of the retaining element, wherein:
        in the lock position, the retaining element is configured to impose a retaining force on the instrument when the instrument is stored within the device, the retaining force being sufficient to overcome the ejecting force of the ejection element and to retain the instrument within the device,
        in the release position, the retaining element is configured to release the instrument and allow the instrument to be ejected from an opening in the device by the ejecting force of the ejection element,
    wherein the retaining element is configured to release the instrument upon a rotation of the cover with respect to the base,
    wherein the retaining element is linked to a rotational element of the hinge, via a link structure, whereby the retaining element is configured to translate upon a rotation of the rotational element,
    wherein the rotational element includes a first rotational member and a second rotational member, connected to a hinge block of the hinge,
    wherein the first rotational member is coupled to the cover, and the second rotational member is coupled to the base,
    wherein the second rotational member is configured to rotate only after a first range of motion of the first rotational member, via an inhibitor stopper, and
    wherein the retaining element is linked to the second rotational member, allowing for linear translation of the retaining element after the first range of motion of the first rotational member.

2. The instrument eject system of claim 1, wherein the retaining element is configured to release the instrument upon at least a 180° rotation of the cover with respect to the base.

3. The instrument eject system of claim 1, wherein the retaining element translates towards a front edge of the device to be in the lock position and towards a back edge of the device to be in the release position.

4. The instrument eject system of claim 1, further comprising a storage guide in the device, the storage guide configured to guide the instrument into a storage position, wherein the device is configured to engage with the ejection element in the storage position.

5. The instrument eject system of claim 1, the device comprising a touchscreen, and the instrument comprising a stylus.

6. The instrument eject system of claim 1, wherein the cover is configured to rotate substantially 360° with respect to the base.

7. The instrument eject system of claim 1, wherein the storage location is within the base of the device, and parallel to a front edge portion of a frame of the device.

8. The instrument eject system of claim 1, wherein the ejection element is a spring.

9. The instrument eject system of claim 1, wherein the instrument includes an engagement element configured to engage with the retaining element for retaining the instrument.

10. The instrument eject system of claim 9, the engagement element comprises a notch, wherein the retaining element includes an insertion component configured to insert into the notch in the lock position.

11. The instrument eject system of claim 1, wherein the retaining element is perpendicularly oriented with respect to the instrument, when the instrument is stored.

12. The instrument eject system of claim 1, wherein the instrument comprises a tab configured to guide the instrument into the lock position within the device.

13. A device configured for touch screen use, the device comprising:
   a storage location for a stylus within the device;
   a cover housing a touch screen;
   a base rotationally coupled to the cover via a hinge;
   an ejection element configured to eject the stylus from the storage location;
   a retaining element configured to retain the stylus within the device by preventing its ejection by the ejection element, wherein the retaining element is further configured to release the stylus upon a rotation of the cover with respect to the base to allow the stylus to be ejected,
   wherein the retaining element is linked to a rotational element in the hinge, such that a rotation of the rotational element linearly translates the retaining element between a lock position and a release position
   wherein the rotational element includes a first rotational member and a second rotational member, connected to a hinge block of the hinge,
   wherein the first rotational member is coupled to the cover, and the second rotational member is coupled to the base,
   wherein the second rotational member is configured to rotate only after a first range of motion of the first rotational member, via an inhibitor stopper, and
   wherein the retaining element is linked to the second rotational member, allowing for linear translation of the retaining element after the first range of motion of the first rotational member.

14. The device of claim 13 wherein the cover is configured to rotate substantially 360° with respect to the base via the hinge.

15. The device of claim 13, wherein the first range of motion is a 180° rotation of the cover with respect to the base.

* * * * *